A. M. LANE.
PORTABLE DRILLING AND TAPPING MACHINE.
APPLICATION FILED MAY 20, 1915.
1,170,171. Patented Feb. 1, 1916.
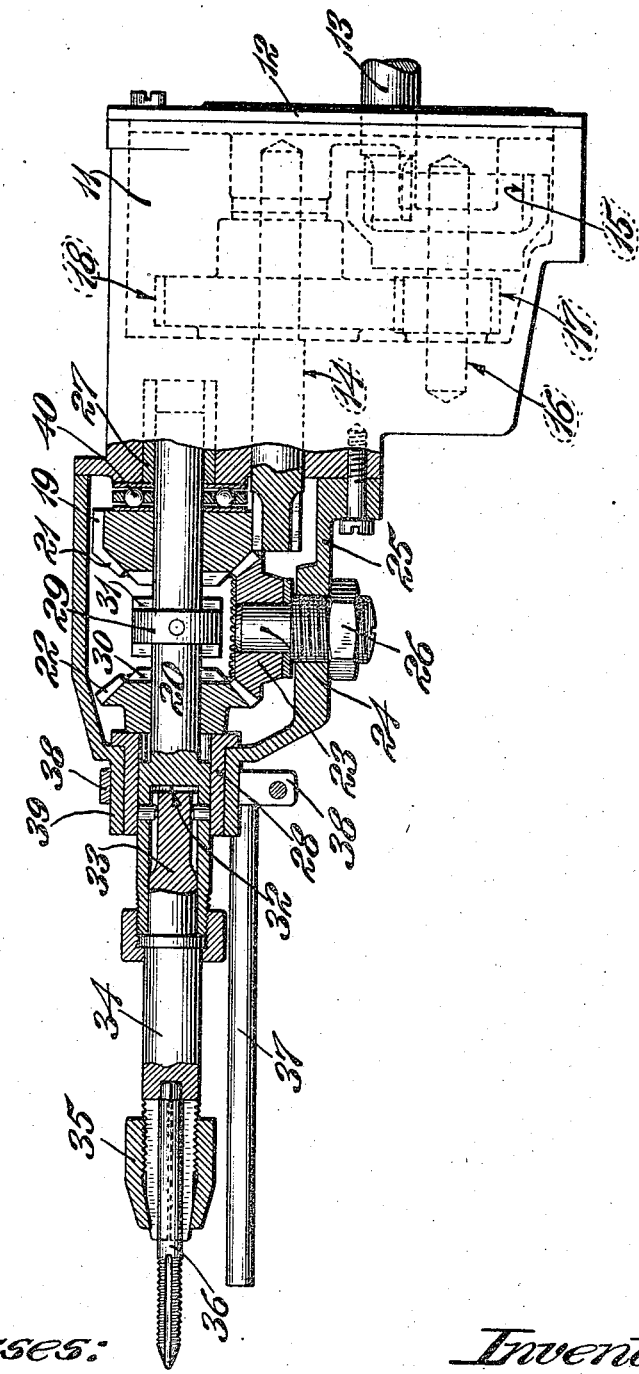

UNITED STATES PATENT OFFICE.

ALFRED M. LANE, OF ST. LOUIS, MISSOURI.

PORTABLE DRILLING AND TAPPING MACHINE.

1,170,171. Specification of Letters Patent. Patented Feb. 1, 1916.

Application filed May 20, 1915. Serial No. 29,291.

*To all whom it may concern:*

Be it known that I, ALFRED M. LANE, a citizen of the United States, and a resident of the city of St. Louis and State of Missouri, have invented a new and useful Improvement in Portable Drilling and Tapping Machines, of which the following is a specification.

This invention relates to portable power driven tools for drilling holes in metal or wood, and consists in a novel spindle construction for such tools whereby a hole can be drilled in sheet metal and tapped with a screw thread in a single operation. The invention also comprises automatic means for stopping the rotation of the tool spindle or socket upon the completion of the tapping operation, and for reversing the direction of rotation of the tool spindle to withdraw the tap from the hole.

Further objects and details of the invention are given in connection with the following description of the machine shown in the accompanying drawing; and what the invention comprises is more particularly defined in the appended claims.

The drawing shows a part side view and part vertical central section of the driving gearing, and the drill spindle and tool chuck of a portable electric drill which embodies the invention. The motor is not shown, as any suitable portable motor may be utilized for the purposes of the invention.

The drilling and tapping mechanism shown in the drawing consist of a gear case 11 which may be secured by screws or other suitable means to the motor plate 12 or to the frame or casing of the motor. The motor armature shaft 13 projects into this casing 11, and has gear teeth cut on its end. The armature shaft is operatively connected to the driving shaft 14 for the tool spindle by means of a train of speed reducing gearing. The speed reducing gearing consists of an annular or internally toothed gear 15 which is engaged by the toothed end of the armature shaft and is driven thereby. This annular gear is secured on a short shaft 16 which is rotatably arranged in the gear casing 11 alongside of the driving shaft and adjacent to the end of the armature shaft. A toothed pinion 17 is also secured on the shaft 16 to rotate therewith, and this pinion engages with a toothed gear 18 on the driving shaft 14 for rotating the latter.

The end of the driving shaft 14 projects through the end wall of the gear casing and is provided with gear teeth which engage with a toothed gear 19 loosely mounted on the inner end of the tool spindle 20. The gear 19 has a bevel gear 21 on one face which drives an oppositely arranged bevel gear 22, which is also loosely mounted on the tool spindle, through an idler bevel gear 23 which is journaled on a short shaft 24 arranged at right angles to the axis of the tool spindle. The bevel gears 21, 22 and 23, constitute a reversing gear for reversing the direction of rotation of the tool spindle, and they are inclosed in a detachable casing or hollow nose piece 25 which is secured to the end of the casing 11 by screws or other suitable means. The shaft 24 is threaded through the side of the reversing gear casing or nose piece, and can be screwed in and out to adjust the mesh of the bevel gears. This shaft 24 is locked in adjusted position by means of a nut 26 which screws on its outer end.

The tool spindle 20 is rotatably and slidably mounted in bushings 27, 28 which are secured in the ends of the gear casing 11 and nose piece 25, respectively. The tool spindle has a clutch sleeve 29 secured to it between the oppositely arranged bevel gears 21 and 22, and said bevel gears have clutch teeth 30 on the adjacent faces or ends of their hubs, which teeth are adapted to be engaged by the teeth 31 on the ends of the clutch sleeve 29 when the drill spindle is shifted axially either inwardly or outwardly through its supporting bushings. The outer end of the tool spindle 20 is provided with a socket 32 for the tang end 33 of a tool chuck 34 which has a suitable clamp socket 35 at its extremity for a drilling and tapping tool 36.

A suitable tool for drilling and tapping sheet metal is made by grinding off the ends of the lands of a fluted tap of the desired size and number of threads to form a V-point.

An automatic stop rod 37 is clamped to the end of the nose piece 25 by means of a split clamping ring 38 which is adjustable along the cylindrical end 39 of the nose piece.

In the operation of the machine, after starting the motor, the end of the tool is pressed against the piece to be drilled and tapped, and this pressure on the tool spindle forces it inwardly and throws the clutch sleeve into clutching engagement with the inner bevel gear 21, thereby causing the tool spindle to rotate in the same direction as said inner bevel gear. After the drill point pierces the metal the tap portion of the tool screws into the hole, and both the drill spindle and the casing of the portable drilling machine approach the metal being drilled until the stop 37 strikes the metal and arrests any further approach movement of the casing. The tool and spindle continue to approach the metal, and thus the tool spindle is caused to move outwardly through its supporting bushings in the nose piece and casing until the clutch sleeve is withdrawn from clutching engagement with the teeth of the inner bevel gear, whereupon the rotation and hence the outward movement of the tool spindle are arrested. If at any time after the tap portion of the tool penetrates the metal the drilling machine is drawn back away from the metal, the result will likewise be an outward withdrawal of the tool spindle from the casing, and it will be unclutched from the inner bevel gear. Further outward withdrawal of the tool spindle will move the clutch sleeve into engagement with the outer bevel gear 22 and thereby reverse the direction of rotation of the tool spindle and cause the tap to back out of the hole.

The parts of the speed reducing and reversing mechanism are small and compactly arranged making the machine light and easy to handle in confined space; a triple reduction in velocity between the armature shaft and the tool spindle is obtained without undue complication; the stopping of the tool is positively brought about by automatic means; and the reversing of the tool spindle is accomplished by merely pulling the machine away from the work.

It is evident that modification may be made in the construction and arrangement of the parts of the machine described above, and the invention is not restricted to the precise details of construction shown in the drawings. Also it is evident that the machine may be used solely as a drilling machine or solely as a tapping machine as circumstances require.

I claim the following as my invention:

1. A portable drilling and tapping tool comprising a gear box adapted to be secured to the casing of a portable motor, said gear box containing speed reducing gearing adapted to be driven from the armature shaft of said motor, a nose-piece secured to said gear box on the side away from said motor casing, a rotary spindle rotatably and slidably mounted in bearings in said gear box and nose-piece, a bevel gear loosely mounted on said spindle near its inner end and driven from said reducing gearing, a second bevel gear arranged on said spindle facing said first bevel gear and driven therefrom by means of a bevel gear meshing with said gears and arranged on a stud mounted in said nose-piece at right angles to said spindle, an antifriction thrust bearing arranged on the inner end of said spindle between said inner bevel gear and said gear box bearing, and a clutch member fixed on said spindle between said bevel gears and adapted to bear against said inner bevel gear to transmit endwise pressure on said spindle through said gear and thrust bearing to said gear box.

2. A portable drilling and tapping tool comprising a gear box adapted to be secured to the casing of a portable motor, said gear box surrounding the end of the armature shaft of said motor, a nose-piece secured to said gear box and forming an extension of one side thereof, a rotary spindle rotatably and slidably mounted in bearings in said gear box and nose-piece, a bevel gear loosely mounted on said spindle near its inner end and having straight teeth on its outer edge meshing with a spur gear mounted on an axis parallel to said spindle and driven from said armature shaft, a second bevel gear arranged on said spindle facing said first bevel gear and driven therefrom by means of a bevel gear meshing with said gears and arranged on a stud mounted in said nose-piece at right angles to said spindle, an antifriction thrust bearing arranged on the inner end of said spindle between said inner bevel gear and said gear box bearing, and a clutch member fixed on said spindle between said bevel gears and adapted to bear against said inner bevel gear to transmit endwise pressure on said spindle through said gear and thrust bearing to said gear box, whereby the proper mesh of said straight toothed gear and spur gear is not disarranged by wear or distortion of said thrust bearing.

Signed at St. Louis, Missouri, this 17th day of May, 1915.

ALFRED M. LANE.